(12) United States Patent
Luft et al.

(10) Patent No.: US 7,203,742 B1
(45) Date of Patent: Apr. 10, 2007

(54) METHOD AND APPARATUS FOR PROVIDING SCALABILITY AND FAULT TOLERANCE IN A DISTRIBUTED NETWORK

(75) Inventors: Siegfried Luft, Vancouver (CA); Warren McCoubrey, Burnaby (CA); Dave O'Neill, North Vancouver (CA)

(73) Assignee: Redback Networks Inc., San Jose, CA (US)

( * ) Notice: Subject to any disclaimer, the term of this patent is extended or adjusted under 35 U.S.C. 154(b) by 806 days.

(21) Appl. No.: 09/904,371

(22) Filed: Jul. 11, 2001

(51) Int. Cl.
*G06F 15/173* (2006.01)

(52) U.S. Cl. .................. 709/223; 709/238; 709/220; 714/1

(58) Field of Classification Search ............ 709/224, 709/216, 226, 229, 223, 238, 220; 714/13, 714/48, 1; 370/395.32, 230; 455/423
See application file for complete search history.

(56) References Cited

U.S. PATENT DOCUMENTS

| | | | |
|---|---|---|---|
| 6,304,549 B1* | 10/2001 | Srinivasan et al. | 370/230 |
| 6,697,970 B1* | 2/2004 | Chisholm | 714/48 |
| 6,735,206 B1* | 5/2004 | Oki et al. | 370/395.32 |
| 6,735,717 B1* | 5/2004 | Rostowfske et al. | 714/13 |
| 6,738,812 B1* | 5/2004 | Hara et al. | 709/224 |
| 6,804,703 B1* | 10/2004 | Allen et al. | 709/216 |
| 6,832,085 B1* | 12/2004 | McDonagh et al. | 455/423 |
| 6,901,440 B1* | 5/2005 | Bimm et al. | 709/223 |
| 2001/0056554 A1* | 12/2001 | Chrabaszcz | 714/13 |
| 2002/0049845 A1* | 4/2002 | Sreenivasan et al. | 709/226 |
| 2002/0133601 A1* | 9/2002 | Kennamer et al. | 709/229 |
| 2002/0174207 A1 | 11/2002 | Battou | |
| 2003/0009551 A1 | 1/2003 | Benfield et al. | |

OTHER PUBLICATIONS

Ali Raza Butt et al, "Economic Fault-Tolerant Networks", Jun. 2000.*

12.G. C. Shoja, and W. Taylor, "Extending the Computational Bandwidth of Engineering Workstations", Proceedings of the Seventh Annual IEEE Phoenix Conference on Computer and Communications, Mar. 16-18, 1988, pp. 357-362.

13.G.C. Shoja, G. Clarke, T. Taylor, and W. Taylor, "A Software Facility for Load Sharing and Parallel Processing in Workstation Environments", Proceedings of the 21st Annual Hawaii International Conference on System Sciences, Jan. 5-8, 1988, pp. 222-231.

14.G. C. Shoja, G. Clarke, and T. Taylor, "REM: A Distributed Facility for Utilizing Idle Processing Power of Workstations", presented at IFIP Conference on Distributed Processing, Amsterdam, Oct. 5-7, 1987, in Distributed Processing, M.H. Barton, etal, editors, North Holland, 1988, pp. 205-218.

* cited by examiner

*Primary Examiner*—Jungwon Chang
(74) *Attorney, Agent, or Firm*—Blakely, Sokoloff, Taylor & Zafman LLP

(57) ABSTRACT

A method and apparatus for providing scalability and fault tolerance to a distributed network. According to one embodiment of the invention, a network management system comprises a set of one or more element management servers. One of the plurality of element management servers is designated as a master server. The master server determines which of the plurality of element management servers are to manage each of a set of one or more network elements. In one embodiment, peered and federated services are used within the network management system to provide scalability and fault tolerance.

28 Claims, 5 Drawing Sheets

METHOD AND APPARATUS FOR PROVIDING SCALABILITY AND FAULT TOLERANCE IN A DISTRIBUTED NETWORK

CROSS-REFERENCE TO RELATED APPLICATIONS

Not Applicable.

BACKGROUND OF THE INVENTION

1. Field of the Invention

The invention relates to the field of network computing. More specifically, the invention relates to providing scalability and fault tolerance in a distributed network.

2. Background of the Invention

The process of maintaining a computer network so as to maximize its efficiency and productivity is very complex. Many techniques have been utilized over the years to achieve this goal. For instance, network scalability and fault tolerance techniques have been used. Network scalability addresses the issue of retaining performance levels when adding additional servers to a network. Additional servers are typically added to a network when additional processing power is required. Network managers utilize various types of networking tools to determine when to add additional servers. However, the processing efficiency of the network does not always improve with the addition of additional servers to the network.

One reason why the improvement sought by the network manager is not realized is that the work load is not distributed equally between all of the servers. In this situation, the new servers may be under-utilized while the other servers are over-burdened with work. Therefore, network managers use many hardware and software solutions in an attempt to ensure the current processing load of each of the servers is maximized efficiently.

Load balancing is a well known technique of dividing the amount of work between two or more servers. One prior art technique of load balancing requires each processing request to first access a master load balancing service (running on one of the servers) that selects which of the servers is to fulfill the request, redirecting that request as necessary.

Different techniques exist to determine which server is to handle different requests. For instance, a master load balancing service may sequentially send a first request to a first server, a second request to a second server, then send a third request to the first server if there are only two servers available to handle the request. This technique is known in the art as round robin distribution.

In other, more, advanced techniques the load balancing service analyzes the amount of work being performed by each of the alternative servers available to handle the request. This load balancing service attempts to determine which server is currently performing the least amount of work and then sends the request to that server.

As stated above, managing network fault tolerance is another technique used to improve network performance. Network fault tolerance addresses the ability to continue normal network operations when individual servers fail. As with network scalability, network managers may utilize hardware and software techniques to provide network fault tolerance.

A typical example of a fault tolerance technique is a hot stand-by server. In general, a hot stand-by server is designed to immediately handle the processing of a primary server once the primary server has failed. In some instances the fail-over to the hot stand-by server is immediate and the network experiences no interruptions of service. In other instances, the time frame between service "uptime" is more substantial. Other examples, of implementing fault tolerance include disk mirroring and RAID applications.

However, current load balancing and fault tolerance solutions are proprietary and therefore unique to individual hardware platforms or software operating systems. As applications have become more distributed across the network, a more reliable and robust method is needed to address the complexities of network scalability and fault tolerance.

BRIEF SUMMARY OF THE INVENTION

A method and apparatus for providing scalability and fault tolerance to a distributed network is described. According to one embodiment of the invention, a network management system comprises a set of one or more element management servers. One of the plurality of element management servers is designated as a master server. The master server determines which of the plurality of element management servers are to manage each of a set of one or more network elements. In one embodiment, peered and federated services are used within the network management system to provide scalability and fault tolerance.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Figure 1:
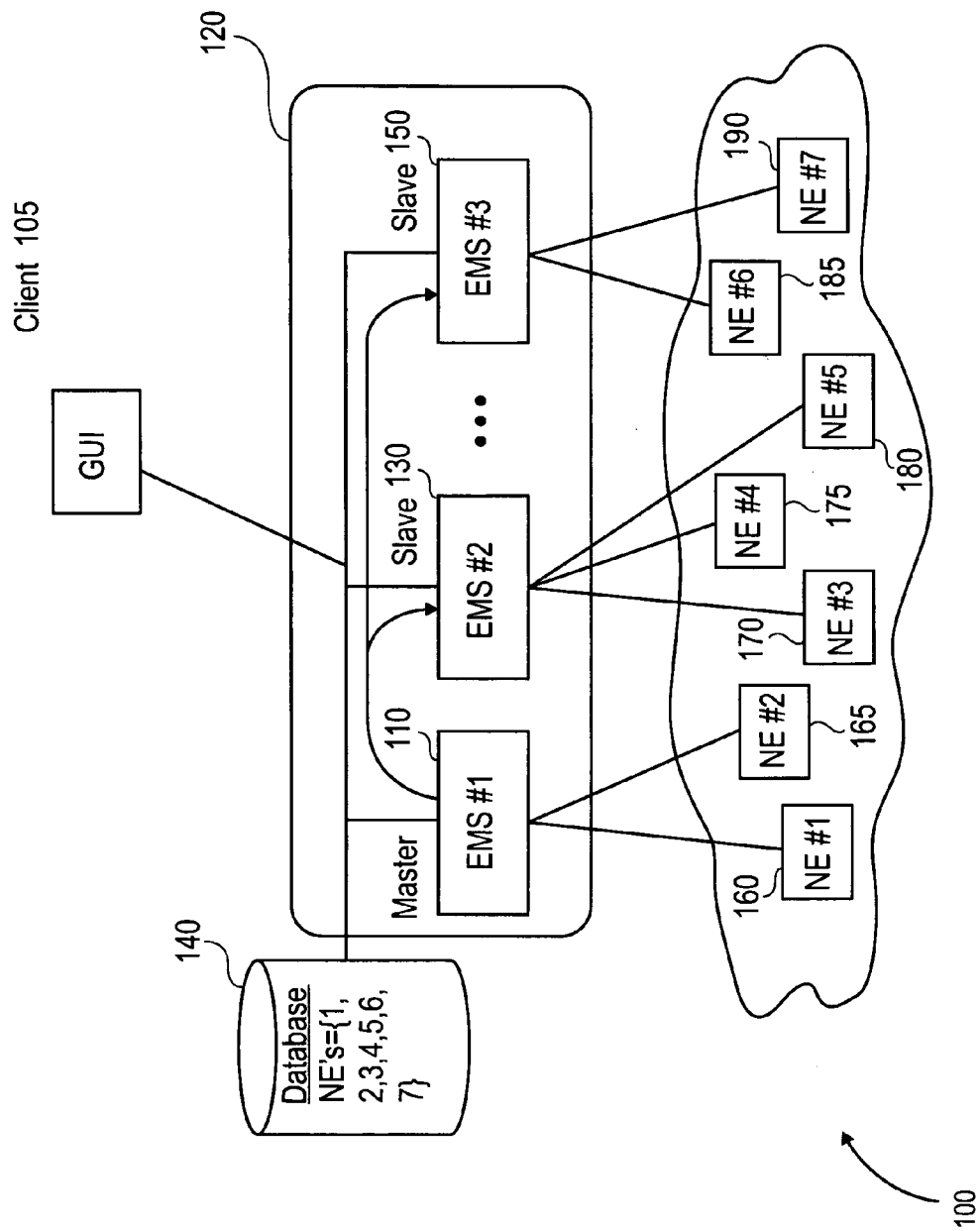
FIG. 1 illustrates a network system where element management servers are deployed to manage a set of network elements according to one embodiment of the invention.

A method and apparatus for providing scalability and fault tolerance to a distributed network is described. Specifically, a scalable and fault tolerant distributed network management system that uses peered and federated services within a federation of servers is described. FIG. 1 illustrates a network 100 where element management servers are deployed to manage a set of network elements according to one embodiment of the invention. By way of example, FIG. 1 shows multiple element management servers 110, 130, and 150. In one embodiment, a distribution service permits these multiple element management servers to be pooled together into a pool of element management servers 120. A federation of element management servers may be pooled together to divide up the work load over multiple hardware platforms thereby providing load balancing. In one embodiment, a pool of element management servers may be responsible for managing a single network. In FIG. 1, element management servers manage network elements 160, 165, 170, 175, 180, 185, and 190.

In one embodiment, the basic unit of work is defined on a per network element basis. That is, the work is divided on the network element level and performed on the element management server(s). Examples of applications which function in this network environment are logging applications, inventory applications, connection management applications, and/or root cause analysis applications. In this way, work may be is distributed across the entire network, although managed from different element management servers, as will be further described below. It should be understood that the invention is not limited to the number of element management servers and network elements shown, and in alternative embodiments multiple element management servers may manage multiple network elements.

In one embodiment, one of the element management servers 110 is designated as the master element management server as will be further described below. The master element management server selects which network elements each of the element management servers is to manage. In FIG. 1, element management server 110 manages network elements 160 and 165; element management server 130 manages network elements 170, 175, and 180; and, element management server 150 manages network elements 185 and 190. In addition, FIG. 1 shows a client user interface 105 that interacts within the network 100 as will be further described below.

The master element management server 110 stores these interrelationships between the pool of element management servers 120 and the network elements (160, 165, 170, 175, 180, 185, and 190) within a database 140. The master element management server may then refer to the database 140 to provide network scalability and fault tolerance as will be further described.

Overview

Figure 2:
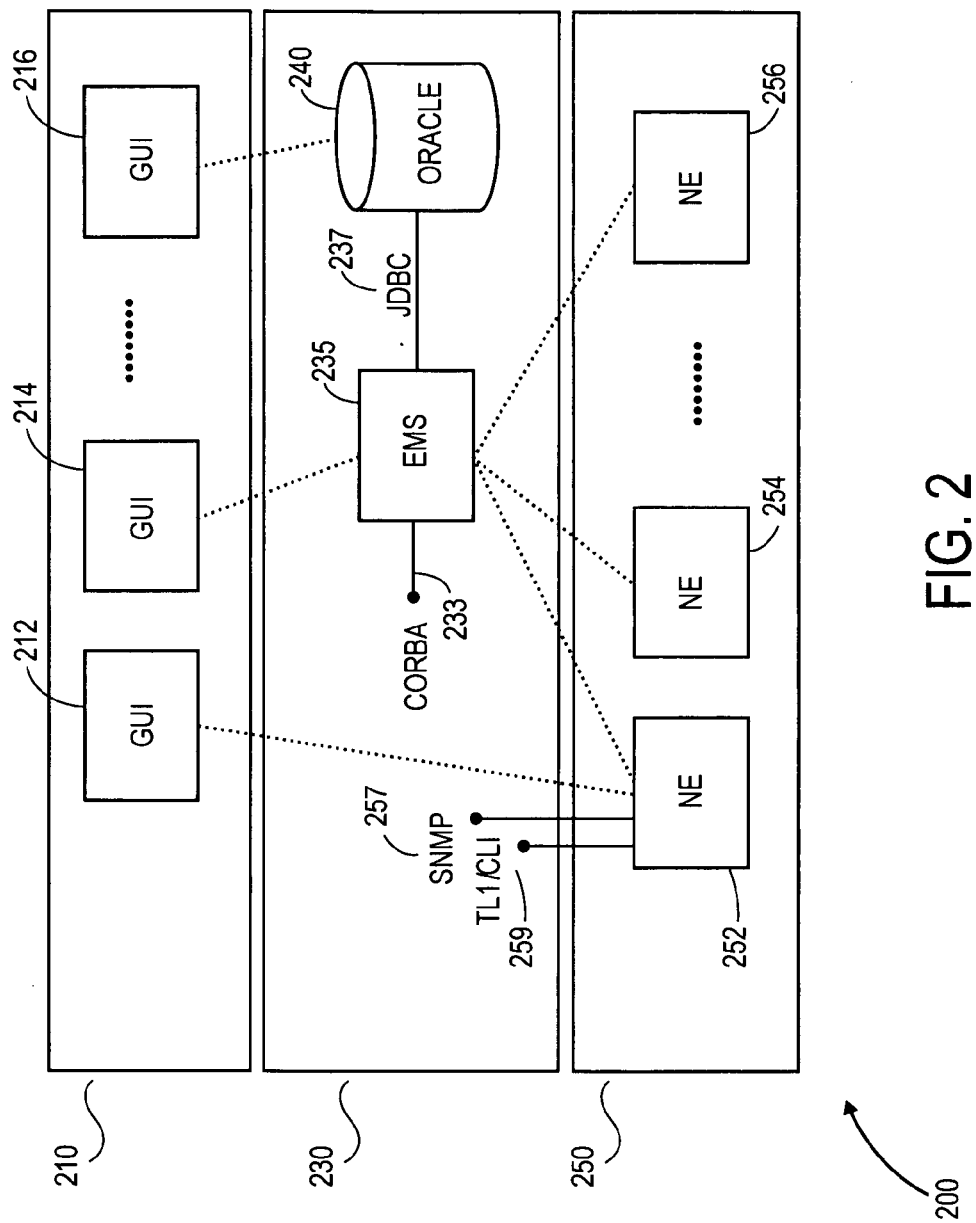
FIG. 2 illustrates a typical network management system 200 according to one embodiment of the invention.

A brief description of the manner in which the element management servers and network elements interact within one embodiment of the invention will now be provided. FIG. 2 illustrates a typically network management system 200 according to one embodiment of the invention. This illustration partitions the network management system 200 into three separate layers: a user presentation layer 210, an element management system layer 230, and a network element layer 250.

In one embodiment, the user presentation layer 210 is represented by a client user interface. By way of example, the illustration shows a browser-based user interface 212 connecting to a network element 252; browser based user interface 214 connecting with a element management server 235; and browser based user interface 216 connecting with database 240. The browser-based user interface protocol may be based on internet protocol (IP) and support the security measures necessary for deployment within public IP networks. In one embodiment, Java applications may be embedded in the browser-based user interface as will be further described below.

The element management layer 230 is comprised of an element management server 235 that includes a number of services tailored to element management. These element management server services may include inventory management, fault management, connection management, transaction management, event log management, alarm management, etc. In one embodiment, these services are characterized as being peered or federated services as will be further described below. Furthermore, these services may be accessible through secure communications by the user presentation layer 210 or exclusively through automated systems. In addition, additional interfaces may be provided for external peering. These interfaces may include a standard CORBA interface 233. The CORBA interface 233 may be used as a north bound interface to other management systems.

In one embodiment, the element management server 235 provides services to monitor the network from a persistent database 240. By way of example, the element management servers 230 may utilize a generic JDBC interface 237 to communicate to the database 240. As a result the element management server 230 can be peered with database 240.

In one embodiment, the element management layer 230, may represent both fixed and mobile element management servers. The fixed element network management server may be a typical subnetwork controller. The mobile element management server may be a laptop. In both cases, however, the element management server 230 to network elements (252, 254, and 256) communications may be based on a physical layer independent IP protocol.

In one embodiment, the network element layer 250 may represent switches and their associated controller cards. By way of example, these controllers may communicate with an element management server 230 via an IP based network. Application software within the network element layer may support auto-discovery, fault tolerance, secure communications and access control lists, dynamic code loading, synchronized data mechanisms, remote call mechanisms, streams, etc. The network element layer may also be implemented to support local 'craft' interfaces to provide TL1 and CL1 command line interfaces 259. These interfaces are accessible through Telnet sessions and accessible through either the RS-232c serial interface or the Ethernet interface located on the shelf controller. The network element layer may also support SNMP command line interfaces 257. In one embodiment, the network element layer 250 resident software is responsible for communicating between the element management layer 230 and the underlying system software.

In one embodiment, the network element layer resident software includes a network element controller, a series of entities, an event log with 'event forwarding discriminators' and an interface to the underlying system software. The node controller is responsible for detecting changes within the network element layer, and creating or deleting entities (e.g., MIB entities) as necessary. The element management layer 230 can persistently maintain historical event/alarm information by monitoring the event log.

As stated above, the network management system 200 may be composed of a series of applications, located in either the user presentation layer 210, the element management layer 230, or the network element layer 250. In one embodiment, each of the described layers contains a Java virtual machine. In this way, Java provides a common architecture that facilitates a closed tied distributed environment. For instance, applications in the various described layers (e.g., on a browser, in the element management server, or the network elements) using Java, have a common data architecture, a common code base, and access to further resources in remote locations.

Java also allows for the transfer of implementation code along with the data, such that the receiving side can reconstitute the code and data to execute it within its native implementation, in memory. However, it should be understood that the invention is not limited to being implemented using Java or a Java virtual machine, and other software implementations may be used to facilitate a distributed environment within the scope of the invention.

Scalability & Fault Tolerance

Figure 3:
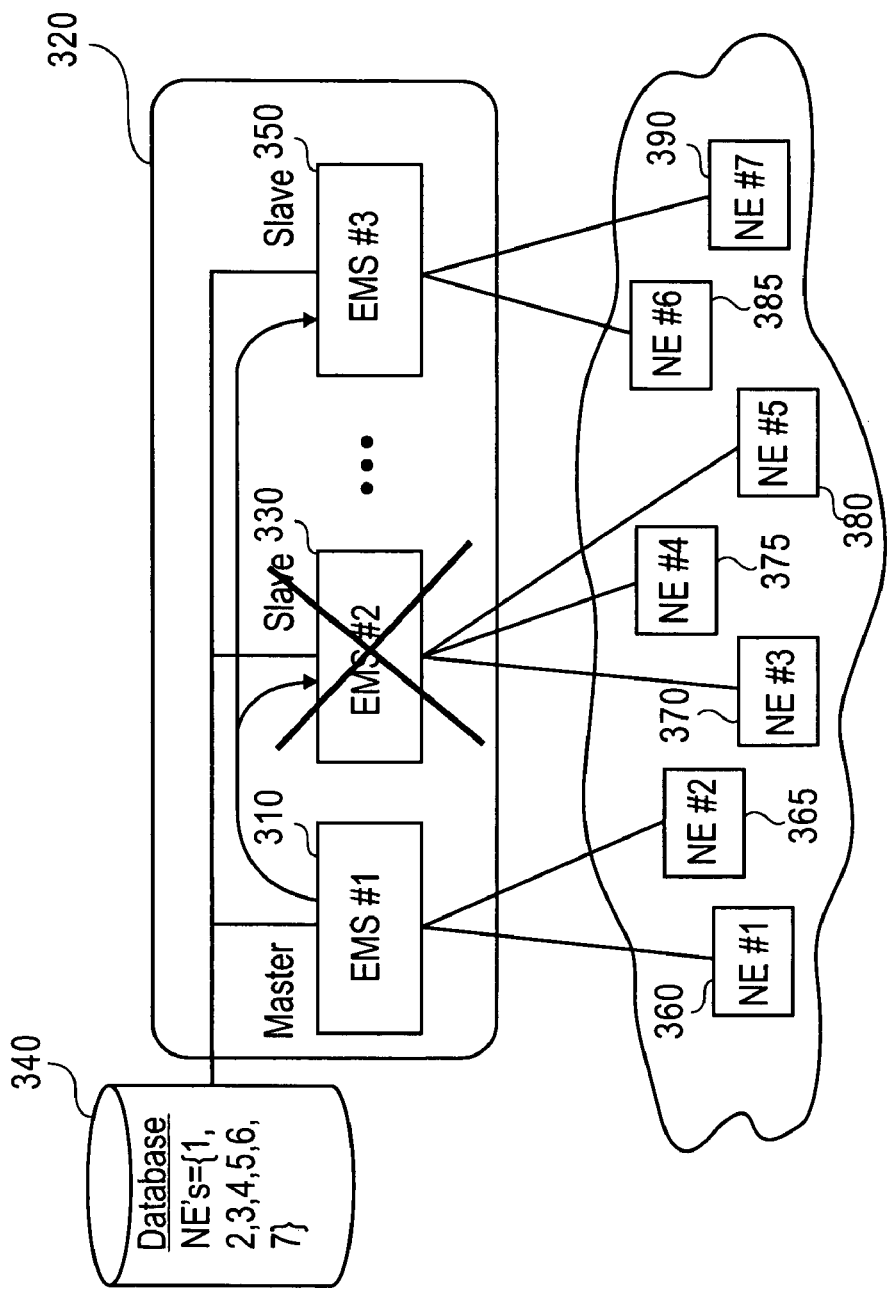
FIG. 3 illustrates fault tolerance according to the embodiment of the invention as described in FIG. 1.

In one embodiment, element management servers may be dynamically inserted or removed from the pool of element management servers thereby providing scalability and fault tolerance to the network. FIG. 3 illustrates fault tolerance according to the embodiment of the invention as described in FIG. 1. In this illustration, element management server 330 is lost to the pool of element management servers 320. Inaccessibility to element management server 330 may have occurred for a variety of reasons including an application failure, server failure, network failure, etc. In one embodiment, a keep alive protocol is used by the master element management server 310 to be alerted when accessibility to a remote element management server has failed. Alternative embodiments may use other mechanisms to detect such a failure (e.g., ping).

In this scenario, the master element management server 310 determines that element management server 330 is inaccessible and understands from the relationships stored in the database 340 that network elements 370 and 375 are no longer being managed. The master element management server 310 then notifies the remaining element management servers that the unmanaged network elements (470 and 375) must be redistributed. Thereafter, the master element management server 310 proceeds to use a distribution algorithm to determine a new load balancing policy, and distributes the delta changes to the remaining element management server 350. The remaining element management server(s) retain the delta changes in case the new master element management server is lost.

By way of example, the distribution algorithm may determine the new load balancing policy by analyzing the network and finding logical boundaries between network elements. In one embodiment, logical boundaries are determined by analyzing the proximity and relationships between the network elements and element management servers. This may be beneficial in a case where a group of network elements to be provisioned are managed by a single element management server. In this way, as much as possible, each element management server can work independently.

For example, in FIG. 3, master element management server 310 has determined that it will now manage the unmanaged network elements 370 and 375 and that the element management server 350 will now manage the unmanaged network element 380. In addition, from the point of view of the individual applications within the element management servers, the applications simply notice that they are responsible for managing new network elements. This allows for seamless scalability and fault tolerance to the network.

The load balancing policy also applies when new element management servers are inserted to a pool of element management servers. For example, a new element management server can be introduced into a pool of element management servers to improve performance of the network as a whole. When the new element management server is inserted to the pool of element management servers, the master element management server determines a new load balance which might result in some managed network element(s) being moved from existing element management servers. In one embodiment, the detecting of when a new element management server has been inserted and/or removed on a network is described in "A Method and Apparatus To Distribute The Presence of Servers and Their Encapsulated Applications" to Siegfried Luft, et al., filed on Mar. 31, 2001, Ser. No. 09/823,773 now abandoned, which is hereby incorporated by reference.

Figure 4:
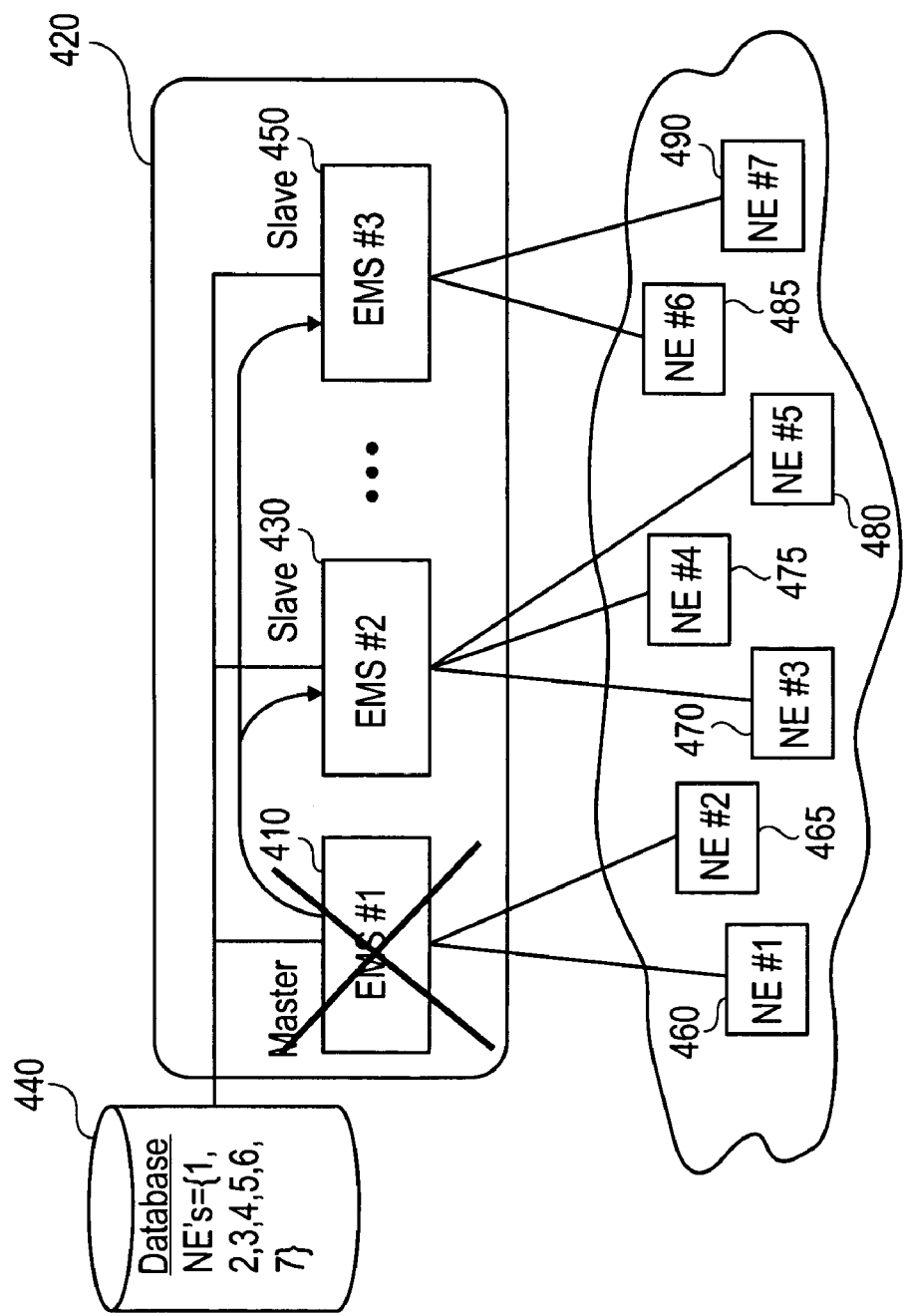
FIG. 4 illustrates fault tolerance where a master element management server is lost according to one embodiment of the invention.

FIG. 4 illustrates fault tolerance where a master element management server is lost according to one embodiment of the invention. Here, the master element management server 410 is lost, possibly due to situations similar to how the element management server 330 was lost, as stated above. In one embodiment, the remaining element management servers 430 and 450 renegotiate a new master element management server. In one embodiment, a bully algorithm is used, which is well known in the art, to renegotiate a new master element server. In one embodiment, the process of selecting a new master element management server may comprise of one element management server designating itself as the master element management server and then informing the other element management servers. Here, as illustrated in FIG. 4, the element management server 430 has been designated as the new master element management server.

Thereafter, the new master element management server 430 contacts the database 440 to understand the global view of what needs to be managed. Each remaining element management server 450 is also contacted to determine what is still being managed. This is done to insure the database is correct. Then, the new master network management server 430 calculates a new load balancing scheme and distributes the delta changes to all of the participating element management servers. Therefore, network elements 460, 465, 470, and 475 are now managed by the new master network element 430; and network elements 480, 485, and 490 are now managed by element management server 450.

Federated Services

As stated above, each element management server may include two types of services, federated and peered. In one embodiment, federated services are applications that independently provide a local view of the network from active data stored in their host element management server's memory. In contrast, peered services facilitate the load balancing of clients to consolidated data as will be further described below.

By way of example, as stated above, a master element management server determines which element management server is to manage each network element. After this determination is made, each of the managed network elements may load data into the memory of their managing element management server from which applications may access or within a persistent data store (e.g. a database). For example, the services within element management servers 110, 130 and 150 may access data stored in the memory of their element management server or data stored in a database. In one embodiment, federated service applications on a given element management server may access MIB data resident in the memory of that same element management server at runtime. This MIB data is loaded into the element management server from its managed network element(s). Here, federated service applications accessing the MIB data are interested in the current state of the MIB data (e.g., synchronized MIBs). One embodiment of transferring synchronized MIB data from network elements to network management servers is described in "Formation of Entity Based Mobile Agents To Provide A Synchronized View In Network Management", to Siegfried Luft, et al., Filed on Mar. 31, 2001, Ser. No. 09/823,781, which is hereby incorporated by reference.

For example, in FIG. 1, element management server 130 may host an alarm management federated service accessing active nodal alarm data stored in the memory of element management server 130. Here, the alarm management federated service within the element management server 130 communicates and manages the network elements 170, 175, and 180. When an alarm is set off on any of these network elements 170–180, nodal alarm data is transferred from that network element to the element management server 130. In this way, each element management server has stored in its memory a copy of the nodal alarms from each network element it manages.

In one embodiment, the client user interface 105 connects to a specific element management server to obtain an active local view of the subset of the network managed by that element management server. To get the summation or full view of the network, the client user interface 105 collects a copy of the data stored in the memory of multiple element management servers.

For example, in addition to the nodal alarm data stored in the memory of element management server 130 for network elements 170–180, also assume, the element management server 110 includes the nodal alarms of network elements 160 and 165; and the element management server 150 include the nodal alarms of network elements 185 and 190. Here, to view the entire network, the client user interface 105 makes a request to a alarm management federated service on each element management server to transfer a summary of the nodal alarm data to the client's memory. As stated above, the client user interface 105 may also contain a Java virtual machine which may aid in the facilitation of the transfer as stated above. Thereby, the client user interface 105 may then combine the summary data of each individual nodal data together to provide a global view of the network.

In one embodiment, the active data resident in the memory of a given element management server may also be copied into a database. For example, the element management server 130 may provide an event log management federated service to a database. Here, the event log management federated service is used to capture network element events and store them in an event log database. In this way, the client user interface 105 may access a view of the event logs by a peered service as will be further describe below.

Peered Services

In one embodiment, the element management servers include peered services. Peered services are applications that can be initiated on any element management server. Thereby the peered service may facilitate the load balancing of clients to element management servers, the load balancing of clients to network resources (e.g., databases), and also bring about a shared state between resources in the network.

Clients may access a peered service on an element management server to request work to be performed within the pool of element management servers. In one embodiment, each client makes the a determination of which element management server to initially contact. Here, each client may include an algorithm which randomly distributes the client's request to the peered services within the pool of network management servers. In this way, the peered services are load balanced and receive a random distribution of client requests.

In one embodiment, each peered service on multiple element management servers contains the ability: (1) to respond to a client's request; (2) to forward the request to a peered service on another element management server that manages the services that may respond to the request; or (3) determine that it does not have the bandwidth to fulfill the request and forward the request to another element management server to process. Thereby, due to this closely tied distributed environment, any element management server may handle a client request equally well.

For example, a peered service on a element management server may connect multiple clients to a database. Here, the client may connect to any of the element management servers hosting the peered service to connect to the database, thereby load balancing multiple clients access to the database. In this way, the peered service on the element management server may also ensure that only one client writes to a database table at any one time, thereby preventing record duplication. In one embodiment, clients that access the database based peered service applications are primarily concerned with the persistent state of the database, while also interested in the current status of the network. In most cases, the persistent database schema is derived from the component MIBs as described above.

Figure 5:
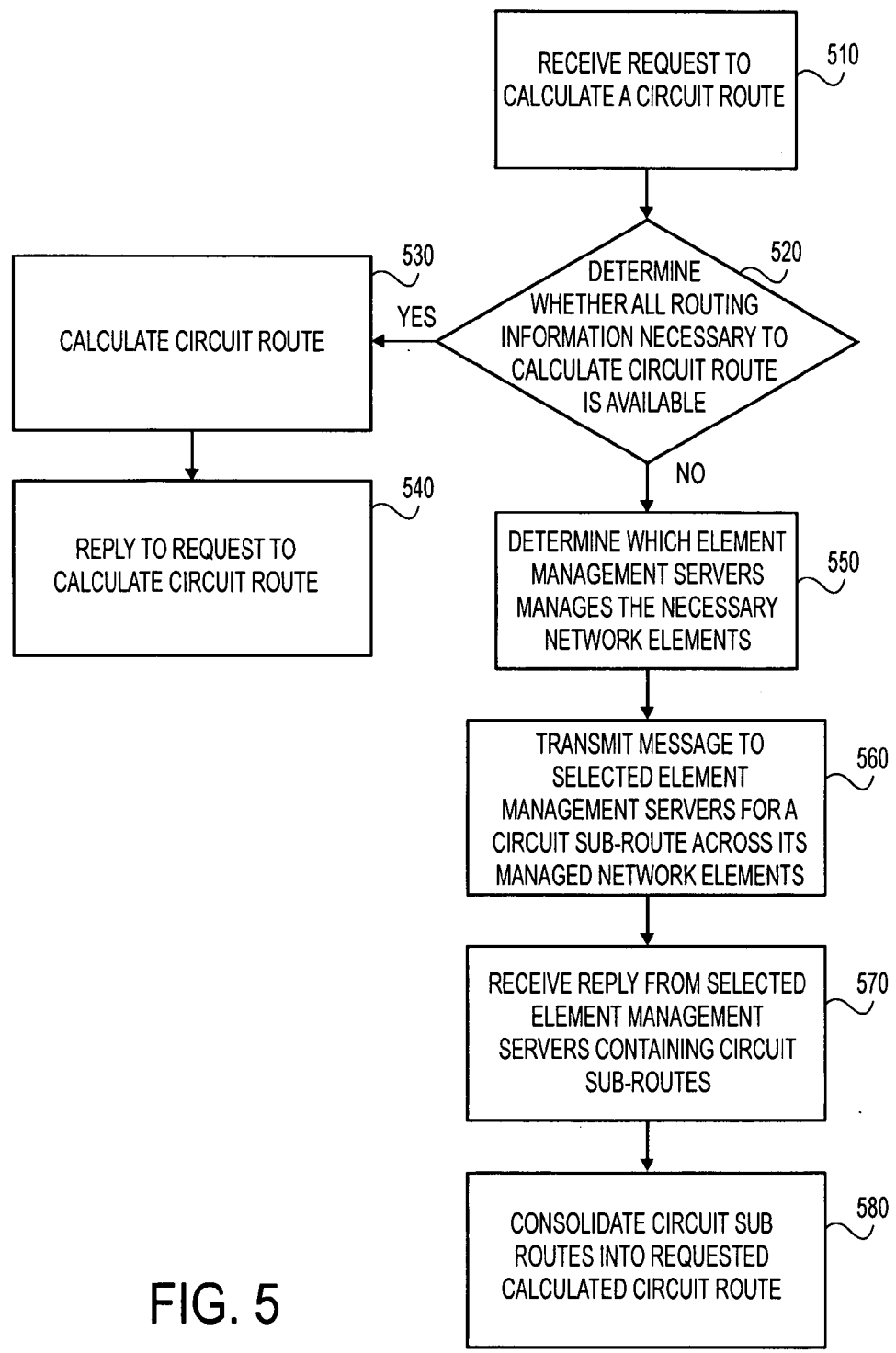
FIG. 5 illustrates a block diagram of the matter in which a circuit route calculation peered service application calculates a circuit route according to one embodiment of the invention.

In another example, FIG. 5 illustrates a block diagram of the matter in which a circuit route calculation peered service application calculates a circuit route according to one embodiment of the invention.

In block 510, a circuit route calculation peered service resident on a element management server receives a request to calculate a circuit route. By way of further illustration, the request is to calculate a circuit route from network element 160 to network element 190 in FIG. 1. It is understood that the request may have been provided by a client to any of the pool of element management servers 120. In those situations where the network elements through which a given circuit route can travel are managed by different element management servers, in one embodiment, the calculation requires the involvement of these different element management servers as described in FIG. 5. By way of example, assume that the request is made to element management server 130.

If in block 520, the circuit route calculation peered service resident on a element management server determines all the routing information to calculate the requested circuit route is available, control passes to block 530. If not, control passes to block 550. To continue the above example, assume that the circuit route calculation peered service on the element management server 130 determines that element management server 130 does not contain the routing data necessary to calculate the requested circuit route.

In block 550, the circuit route calculation peered service determines which element management servers manage the necessary network elements to have the requested circuit route calculated. To continue the example, the circuit route calculation peered service on element management server 130 determines that the element management servers 110 and 150 manage the network elements from which the requested circuit route is to be calculated. In one embodiment, the circuit route calculation peered service on element management server 130 may view the database 140 to determine which network elements would have to be traversed to calculate the route, thereby discovering the element management servers (110 and 150) they are managed by. In one embodiment, the circuit route calculation peered service on element management server 130 determines how the managed network elements are bridged by the data stored in the database 140.

In block 560, the circuit route calculation peered service transmits a message to the selected element management server(s) to calculate a circuit sub-route through its managed network elements. To continue the example, since the circuit route calculation peered service on element management server 130 does not manage all the network elements from which the requested circuit route is to be calculated, the element management server 130 transmits a message to the selected element management servers 110 and 150 to calculate a circuit sub-route. In this way, element management servers 110 and 150 will calculate the circuit sub-route for their managed network elements and the element management server 130 will calculate the circuit sub-route for its managed network elements. In one embodiment, the circuit route calculation peered service on each of the element management servers may calculate a circuit sub-route using a topology inference engine federated service on that element management server. Here, the topology inference engine federated service is responsible for discovering and storing the various routes between the network elements managed by their element management servers. In this way, the circuit route calculation peered service and topology inference engine federated service both on the same element management server communicate to calculate the circuit sub-route. To continue the example, when the selected element management servers 110 and 150 have completed calculating the sub-route, they transmit their sub-routes back to the element management server 130.

In block 570, the circuit route calculation peered service receives the calculated circuit sub-routes from the selected element management servers of the necessary network elements. To continue the example, circuit route calculation peered service on element management server 130 receives the calculated circuit sub-routes from the necessary network element(s) managed by the selected element management servers 110 and 150.

In block 580, the circuit route calculation peered service consolidates the various calculated circuit sub-routes and generates the calculated requested circuit route. Here, circuit route calculation peered service on element management server 130 combines the various calculated routing information into the calculated requested circuit route from network element 160 to network element 190. Then, in one embodiment, the element management server 130 may either communicate the calculated route back to the requestor or initiate a process to build the circuit.

Back to block 530, it is determined that the circuit route calculation peered service resident on the host element management server has all the routing information to calculate the requested circuit route, thereby the requested circuit route is calculated, and control then passes to block 540. To continue the example, it is determined that element management server 130 manages all of the network elements to calculate the requested circuit route and calculates the circuit route. In block 540, the request would be replied to.

ALTERNATIVE EMBODIMENTS

It should be understood that the invention is not limited to the embodiment where a circuit route calculation peered service resident on an element management server request and receives a circuit sub-route from each different element management server, as described above, to provide a requested circuit route. Rather, in an alternative embodiment, a circuit route calculation peered service resident on an element management server calculates a requested circuit route from routing information stored in a database. Again, this is when the routing information to calculate the requested circuit route is not available on the element management server hosting the circuit route calculation peered service because the network elements through which a given circuit route can travel are managed by different element management servers. Here, the database is populated with routing information supplied by the different element management servers. In this way, the circuit route calculation peered service may use the routing information stored in the database to calculate the requested circuit route without requesting each different element management server to provide a circuit sub-route.

For example, if the circuit route calculation peered service resident on element management server 130 determines all the routing information to calculate the requested circuit route is not available on element management server 130, then the circuit route calculation peered service on the element management server 130 communicates to and receives the necessary routing information from the database 140. The circuit route calculation peered service on the element management server 130 then uses this routing information to calculate the requested circuit route.

Although federated and peered services have been described separately, in alternative embodiments, a given application may provide the functionality of both a federated and peered service. For example, an event management type peered service application may provide a view of the event log database populated by the federated service described above. Here, a client through it's random distribution algorithm makes a request to any of the network management servers for a view of the event logs. The client connects to the peered service on a network management server, then the peered service performs the requested transactions to the database and returns the results to the client. In this way, the event management peered service load balances' the number of clients accessing the database at any one time. As illustrated, the request may be made from any one of the element management servers, then directed by the peered service to the element management server containing the database. As a result, the invention does not require a single master server to decide which server is to load balance which request as described in the prior art.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A network management system comprising:
  a plurality of element management servers to manage a set of one or more network elements, one of said plurality of element management servers to be designated as the master server, said master server to,
    determine which of said plurality of element management servers to manage each of said set of one or more network elements,
    detect a failure of one or more of said plurality of element management servers, and manage the failure by determining which of said non-failed plurality of element management servers are to manage each of said set of one or more network elements; and a peered service resident on each of said plurality of element management servers to handle a request from a client, wherein the peered service on one of the element management servers can forward the request to the peered service on another element management server.

2. The network management system of claim 1 where each of said plurality of element management server includes:

a federated service, said federated service to access data stored in a element management server memory, said element management server memory includes data to describe each of said set of network elements to be managed by each of said plurality of element management servers.

3. The network management system of claim 2 where said federated service to access nodal alarm data in said element management server memory.

4. The network management system of claim 2 where said federated service to provide data to a data store.

5. The network management system of claim 2 where said federated service to provide event log data to a data store.

6. The network management system of claim 1 where said plurality of element management servers to determine with a bully algorithm which of said plurality of element management servers is designated as said master server.

7. The network management system of claim 6 where said peered service resident on said plurality of element management servers to access a database to handle said request.

8. The network management system of claim 1 where said peered service resident on said plurality of element management servers to access event log data in said database.

9. The network management system of claim 8 where said peered service resident on said plurality of element management servers to calculate a circuit route to handle said request.

10. The network management system of claim 1 where said client to randomly select one of said plurality of element management servers to handle said request.

11. The network management system of claim 1 where said client to randomly access a peered service on said plurality of element management servers.

12. The network management system of claim 1 where said client to generate a view of said of network elements and said plurality of element management servers from data stored in a database.

13. The network management system of claim 1 where said client to randomly access a federated service on said Plurality of element management servers.

14. The network management system of claim 1 where said client to generate a view of said set of network elements and said plurality of element management servers from data stored in said element management server memory.

15. A machine-readable medium that provides instructions, which when executed by a set of one or more processors, cause said set of processors to perform operations comprising:

pooling a plurality of element management servers, said plurality of element management servers to manage a set of network elements;

designating a master server from said plurality of element management servers, said master server to, determine which of said plurality of element management servers to manage each of said set of network elements, detect a failure of one or more of said plurality of element management servers, and manage the failure by determining which of said non-failed plurality of element management servers are to manage each of said set of network elements; and receiving a request from a client, said request to be handled by a peered service resident on each of said plurality of element management servers, wherein the peered service on one of the element management servers can forward the request to the peered service on another element management server.

16. The machine-readable medium of claim 15 further comprising:

receiving a request for data stored in element management server memory, said request to be handled by a federated service, said federated service to access said data stored in element management server memory, said data to describe each of said set of network elements to be managed by said plurality of element management servers.

17. The machine-readable medium of claim 16 where said federated service to access nodal alarm data in said element management server memory.

18. The machine-readable medium of claim 16 where said federated service to provide data to a data store.

19. The machine-readable medium of claim 16 where said federated service to provide event log data to a data store.

20. The machine-readable medium of claim 15 where said plurality of element management servers to determine with of said plurality of element management servers is designated as said master server.

21. The machine-readable medium of claim 20 where said plurality of element management servers to determine with a bully algorithm which of said plurality of element management servers is designated as said master server.

22. The machine-readable medium of claim 15 where said peered service resident on said plurality of element management servers to access a database to handle said request.

23. The machine-readable medium of claim 15 where said peered service resident on said plurality of element management servers to access event log data in said database.

24. The machine-readable medium of claim 15 where said client to randomly select one of said plurality of element management servers to handle said request.

25. The machine-readable medium of claim 15 where said client to randomly access a peered service on said plurality of element management servers.

26. The machine-readable medium of claim 15 where said client to generate a view of said of network elements and said plurality of element management servers from data stored in a database.

27. The machine-readable medium of claim 15 where said client to randomly access a federated service on said plurality of element management servers.

28. The machine-readable medium of claim 15 where said client to generate a view of said set of network elements and said plurality of element management servers from data stored in said element management server memory.

* * * * *